United States Patent [19]

Neary

[11] 4,282,672
[45] * Aug. 11, 1981

[54] DIVING PLANE FOR FISHING

[75] Inventor: Joseph F. Neary, Novato, Calif.

[73] Assignee: Troller Corporation, Corte Madera, Calif.

[*] Notice: The portion of the term of this patent subsequent to Dec. 19, 1995, has been disclaimed.

[21] Appl. No.: 894,463

[22] Filed: Apr. 10, 1978

Related U.S. Application Data

[63] Continuation-in-part of Ser. No. 778,829, Mar. 17, 1977, Pat. No. 4,129,956.

[51] Int. Cl.³ ............................................. A01K 97/00
[52] U.S. Cl. .................................................... 43/43.13
[58] Field of Search .................. 43/43.12, 43.13, 43.1, 43/44.9, 44.91, 42.04

[56] References Cited

U.S. PATENT DOCUMENTS

| | | | |
|---|---|---|---|
| 2,062,718 | 12/1936 | Kallberg | 43/43.13 |
| 2,749,648 | 6/1956 | Schneider | 43/43.12 X |
| 3,583,089 | 6/1971 | Scarbro | 43/43.13 |
| 3,643,370 | 2/1972 | Cook | 43/43.13 |
| 3,755,955 | 9/1973 | Saia | 43/43.13 |
| 3,835,573 | 9/1974 | Borchardt | 43/43.13 X |
| 3,879,884 | 4/1975 | Tucker | 43/43.12 X |
| 3,897,648 | 8/1975 | Neary | 43/43.13 |
| 3,940,872 | 3/1976 | Weber | 43/43.13 |
| 4,129,956 | 12/1978 | Neary | 43/43.13 |

*Primary Examiner*—Nicholas P. Godici
*Attorney, Agent, or Firm*—Townsend and Townsend

[57] ABSTRACT

A diving apparatus is placed in serial connection with the end of a fishing line, approximate to the trailing and submerged end of the line as the line is used in trolling. The apparatus includes a diving platform constructed with an aperture and spanner for a catch member in the central portion of the platform. An improved release mechanism is disclosed, including a loop member which loops the spanner and extends pivotally downward from the point of release member attachment to the trailing line, hook and bait. The remainder of the line end attaches to a flared catch member, which attached and flared member is provided with opposed arcuate portions for capturing therebetween said loop member. A bridle connected to the forward and leading end of the platform preserves the diving angles as a function of the line length left from the vessel, independent of bait, weight or buoyancy. Platform release to a non-diving mode can occur by a release force exerted on the diving platform in excess of any adjustable bias provided to the two flared portions of the release member. This release force can be produced two ways, either by strike of a fish or rapid upward force on the pull end of the line. The release mechanism is capable of rigid bracing between depending flukes from the bottom portion of the platform, so that straight in-line towing can result, as required in party-boat fishing. Provision is made for calibrated adjustment to the release force.

7 Claims, 9 Drawing Figures

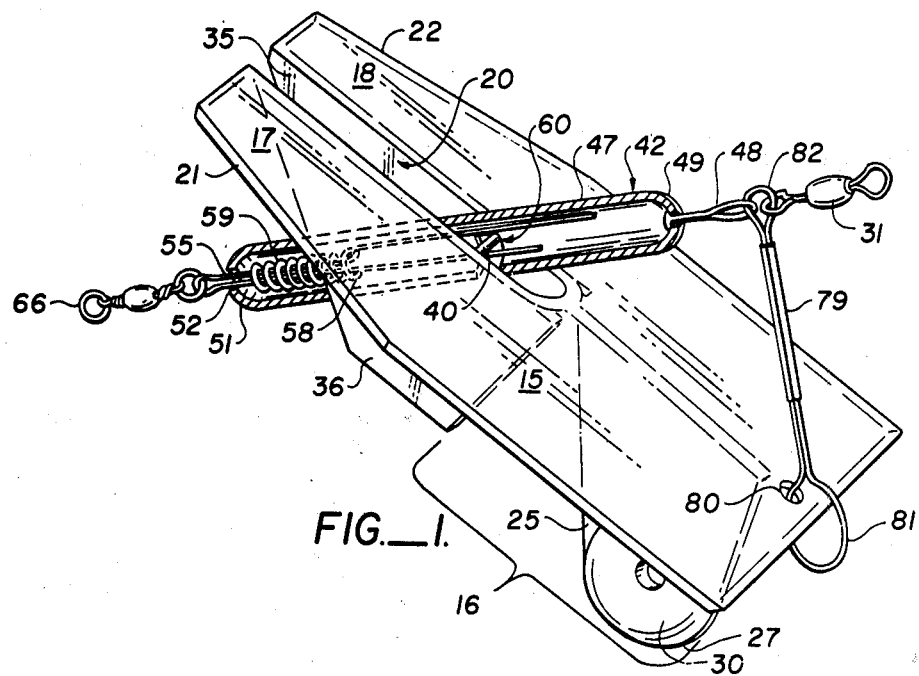
FIG._1.
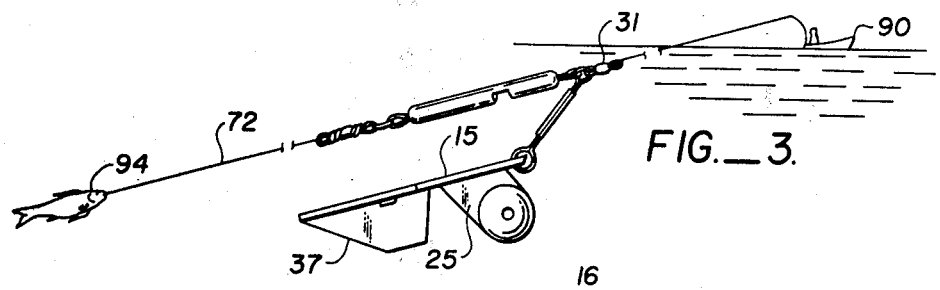
FIG._2.
FIG._3.
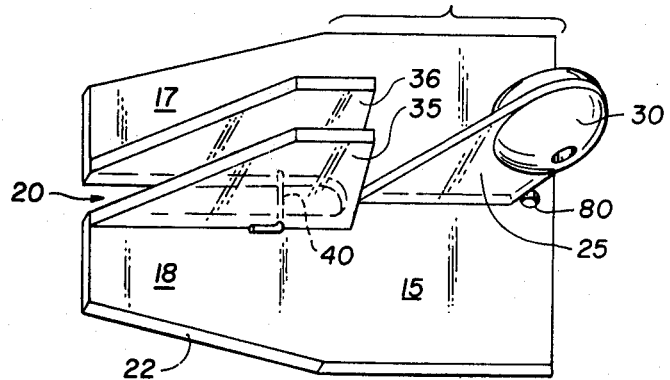
FIG._4.

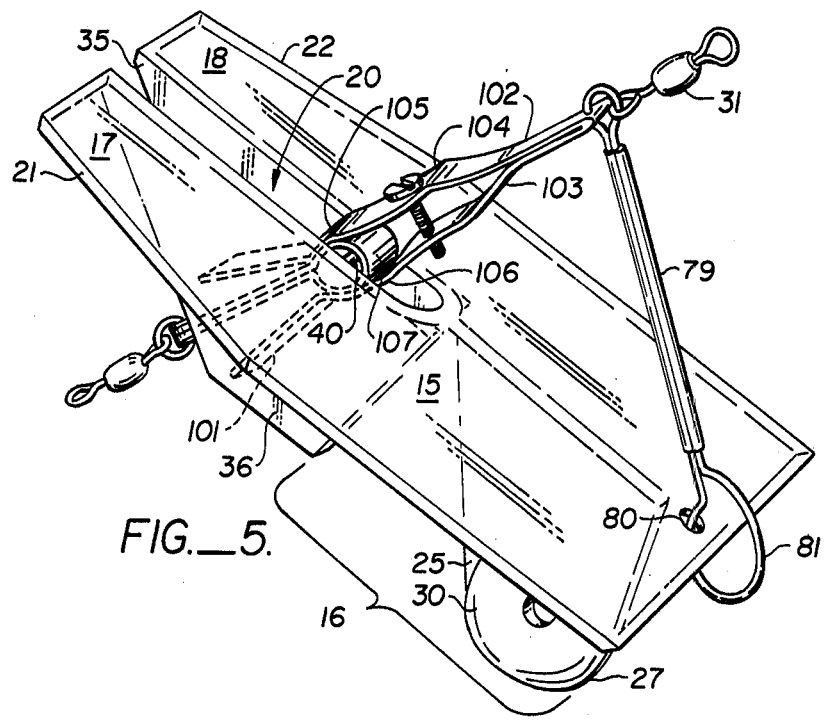
FIG._5.
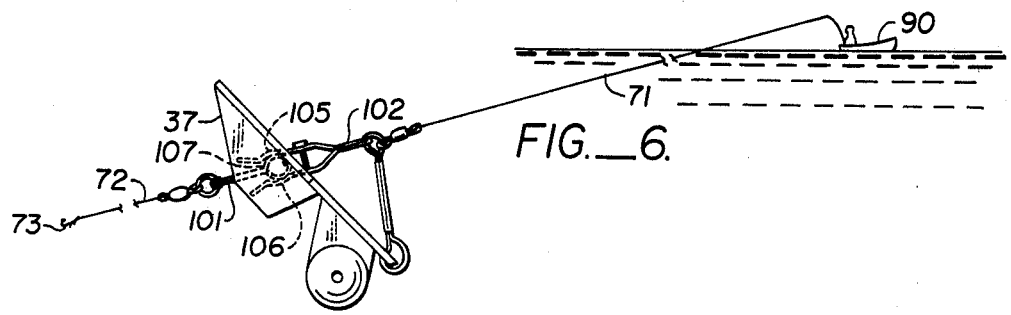
FIG._6.
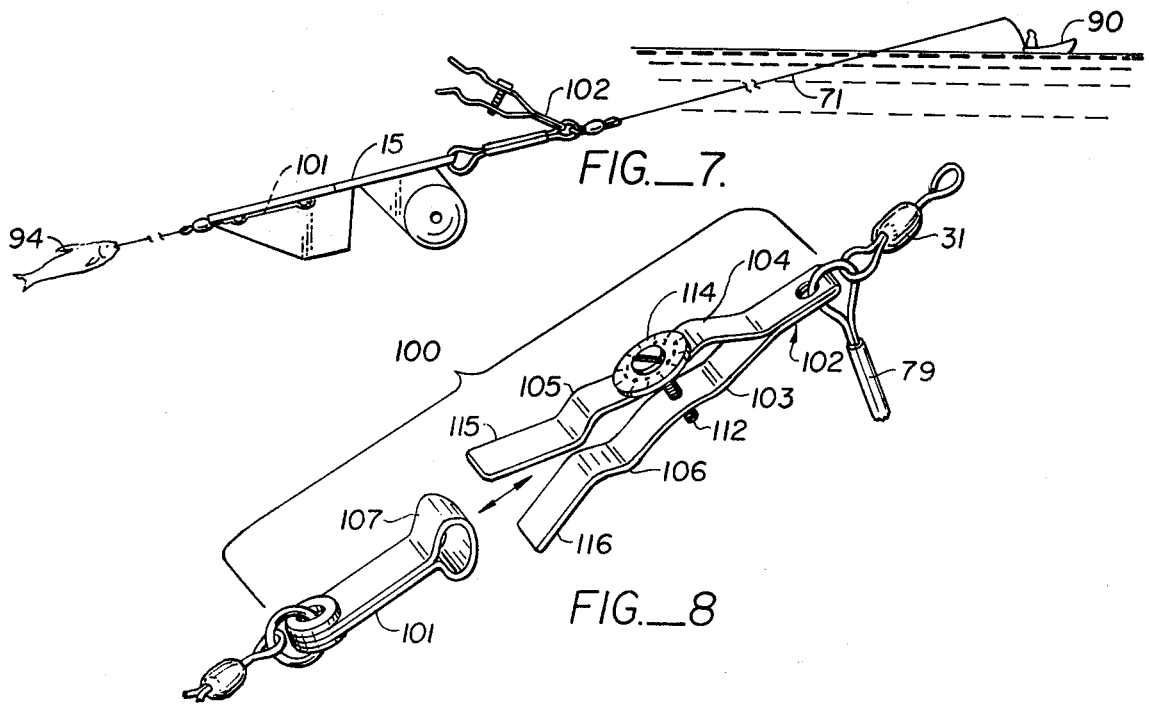
FIG._7.
FIG._8

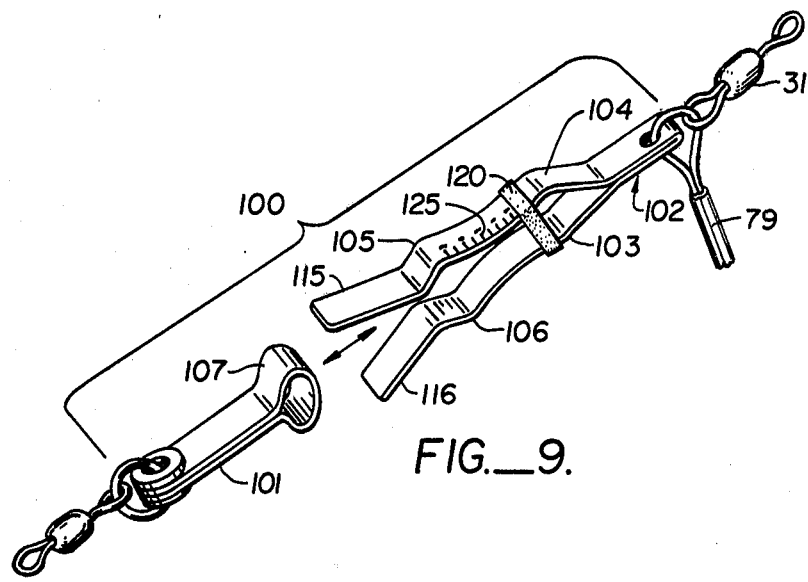
FIG._9.

DIVING PLANE FOR FISHING

CROSS REFERENCE TO RELATED APPLICATION

This present patent application is a continuation-in-part of patent application Ser. No. 778,829, filed Mar. 17, 1977, now U.S. Pat. No. 4,129,956, and includes an improved release mechanism providing topside release of diving plane with the prevention of weight or buoyancy of the pending bait changing the diving angle.

This invention relates to diving planes for sinkers, and more importantly, discloses an improved diving plane capable of non-entanglement with adjoining lines trolled from a vessel having multiple trolling lines.

STATEMENT OF THE PROBLEM

Diving platforms heretofore used in trolling typically do not track the trolling vessel in a straight line. Heretofore, such trolling platforms have had a tendency to introduce a side-to-side wobble as they are towed at various speeds through the water by the vessel. Where multiple lines depend in the wake of a vessel, such side-to-side motion is unacceptable. Entanglement of the lines occurs with lack of transverse stability of the towed platform.

This problem of side-to-side wobble is especially acute in modern "party boat" fishing. In such fishing, multiple amateur fishermen are taken to sea and fish from closely spaced and assigned positions from a party boat. Entanglement problems of diving platforms have led to such platforms being wholly banned on such party boats.

Where platforms are not used, conventional weights must be used to submerge the line. As these weights are lost when a fish strikes and are not recoverable, they are both costly and ofttimes unpredictable in the trolling depth obtained.

STATEMENT OF THE PRIOR ART

In my prior art U.S. Pat. No. 3,897,648, issued Aug. 5, 1975, entitled "Diving Plane For Fishing Vessel", I disclose an improved diving plane for fishing.

In my prior art Diving Sinker, it has not been possible to effect release of the sinker from a diving mode by rapid upward pulling on the pole end of the line. The result has been an inordinately long period of time and a correspondingly greater amount of effort in recovering the diving plane device from a trolling depth.

Devices permitting recovery by pulling on the pole end of the line are known. See, for example, Cook et al U.S. Pat. No. 3,643,370.

Generally, however, these devices maintain their diving depth as a function of two parameters. First is the length of line let out from the boat. Second is the weight or the buoyancy of the bait being towed. Unpredictable and variable depth results.

This variable depth results as a straight line is not defined between the towing point of the diving platform and the towed hook and bait. When a straight line between towed bait and the point of platform tow does not occur, diving angle can change as a given length of line is let out from a trolling boat. Trolling at different and unpredictable depths results. Moreover, such devices are not designed for ease of hand manipulation under the adverse conditions commonly experienced in fishing. For example, screw adjustment of clamping devices and forced hand movement of a pivotal ball member between protruding and clamping devices are required by the prior art.

OTHER OBJECTS AND ADVANTAGES OF THE INVENTION

An object of this invention is to disclose a diving plane for fishing which will dive in a substantially vertical plane with respect to a trailing and towed trolling line. Over my prior art U.S. patent, I have added an improved keel and trailing fins. The trailing fins are disposed to brace rigidly there between the release mechanism to hold the towing point of the non-released platform in a rigid, three-dimensional spaced relation from the platform.

An advantage of this invention is that the diving platform can now be used in a multiple line boat, especially a party boat having numerous amateur fishermen assigned relatively closely spaced stations. This effect is believed due to clamping the release mechanism and projecting fins maintaining the platform in fixed angular relationship to the towing trolling line. The bait or lure end of the line has transverse stability imparted to its towed path to prevent entanglement of adjoining and closely spaced lines.

A further advantage of this invention is that the keel and fins, as formed to and normally depending from the platform, reinforce the planar rigidity of the platform with a beam-like action. The tendency of the platform to bend or distort in towing movement and resultant instability due to bending or distortion of the platform is reduced.

A further advantage of the disclosed diving platform is that the hydraulic effect on the platform produces the desired diving. Differing sizes of trailing bait or lures do not substantially effect the performance of the platform. Instead, the platform dives each time to a depth which is a function of the length of line let out and not the size of bait or lure towed by the platform.

A further advantage of the disclosed diving sinker is that it has the conventional advantage of my prior art diving platform—it is recoverable when a strike occurs and can be reused many times without loss of weights. Upon occurrence of a strike, platform and line surfacing results.

A further advantage of this invention is that upon the struggling movement of a hooked fish, the released platform easily tracks the line. The platform and weight do not unnecessarily surcharge recovery of the line and fish.

An object of this invention is to disclose an improved mechanism for topside release of a diving plane from a diving mode. According to this aspect, the diving platform is configured with an aperture in the central portion thereof, having a spanner. A release member, comprising a lower loop member and an upper flare portion, is provided. The lower looped portion fits around the spanner and depends where the trailing leader hook and bait are attached. The upper release portion includes first and second flared legs. These legs have first and second opposed arcuate portions for receiving and capturing therebetween the looped portion. By the expedient of inserting the flared member over the looped portion at the opposed arcuate segments, capture of the release member occurs.

An advantage of this invention is that the disclosed improved release member can fit in a diving platform, having the release member rigidly braced normal to the platform. The release member forms a rigid and normal bridle mechanism for preventing oscillating side to side movement of the platform as it is towed through the water.

A further object of this invention is to disclose a release mechanism, wherein the weight and buoyancy of the towed bait does not unpredictably vary diving depth. Moreover, movement of the bait with respect to the point of platform tow does not cause platform release. The looped member is free within an angle of at least 20° to pivot upwardly or downwardly responsive to the towed path of the bait. In such pivot, release of the release member does not occur.

An advantage of this aspect of the invention is that depth of the trolling platform is merely a function of the length of line let out from the trolling vessel. Weight and buoyancy of trailing bait does not change the diving angle nor the depth.

Yet a further object of this invention is to provide a release mechanism which is adjustable by hand. According to a first embodiment of this aspect of the invention, the flared portions are interconnected by an adjustable member, such as a thumb screw. By changing the spacial interval between the flared portions and relying on the elasticity of their respective leg adjustment to the release mechanism, predetermined tensions can be obtained by hand.

According to a second aspect of this portion of the invention, the paired legs of the release mechanism can be biased one towards another by a band, the band itself preferably being elastic. By the expedient of changing the mechanical advantage of the band towards and away from the flared extremities of the release mechanism, adjustable release force can be provided.

An advantage of both of these aspects of the invention is that adjustment of release tension can occur under all weather conditions by hand only. Manipulation with screwdrivers, pliers, or the like, is avoided.

A further advantage of this invention is that the bias of the flared catch member is adapted to calibrated adjustment.

Yet a further advantage of this invention is that the adjustable release mechanism is inexpensively constructed.

DESCRIPTION OF THE DRAWINGS

FIG. 1 is a perspective view showing the sinker release connected to the platform in a diving situation;

FIG. 2 is a side elevation diagrammatically showing the interrelationship of the trolling vessel during a diving trolling condition;

FIG. 3 is a diagrammatic view similar to FIG. 2 in which the diving platform is out of the diving condition due to line tension caused at the release mechanism by the strike of a fish;

FIG. 4 is a bottom perspective view of the platform illustrating the improved fins and keel of this diving platform.

FIG. 5 is a perspective view of an alternate embodiment of this invention, showing the sinker release connected to the platform in a diving situation.

FIG. 6 is a side elevation schematic showing the alternative embodiment of FIG. 5 of this invention, illustrating the interrelationship of a trolling vessel during a diving trolling condition;

FIG. 7 is a diagrammatic view similar to FIG. 6, in which the diving platform is out of the diving condition due to line tension caused either by a strike or increased pole tension;

FIG. 8 is a perspective detail of a first embodiment of the release mechanism, illustrating calibrated thumb screw adjustment; and, FIG. 9 is an embodiment of a second configuration of the release mechanism, the respective bias of the release mechanism being adjustable by band position.

DETAILED DESCRIPTION OF THE DRAWINGS

With reference to all the figures, the apparatus of this invention includes a planar diving platform 15. The platform has a base portion 16 and a pair of projecting flukes 17, 18. The flukes are spaced apart from the base portion 16 to define a longitudinally trailing and rearwardly opening slot 20 in the platform. Preferably, the flukes taper at boundaries 21, 22 at an approximate 15° angle from the side edges of the platform to provide a decreasing trailing area to the platform. This decreasing area tapers away from base 16 to the end of the flukes.

The platform includes three depending members. First, there is a depending keel member 25. Keel member 25 fastens to base member 16 in longitudinal alignment with slot 20. Keel member 25 fastens to the base 16 ahead of the slot and depends downwardly and forwardly terminating in a rounded, lower boundary 27. Paired semi-hemispherical lead weights 30 are clamped across keel member 25 at an aperture 31 and are typically held in this position by a rivet (not shown).

Paired fins 35, 36 extend normally down from the platform 15 on either side of the slot 20. Fins 35, 36 are juxtaposed to the side edges of the slot so that they form a smooth and uninterrupted planar surface commencing with the boundaries of the slot and extending downwardly to and between their confronted surfaces. Like flukes 17, 18, fins 35, 36 taper rearwardly at borders 37 to present decreased surface area at the trailing end of the flukes.

Integrally formed and embedded within the platform 15 and fins 35, 36 of the invention is a horizontal cross bar 40. Cross bar 40 is grasped by the release member 42 which is utilized when the platform 16 is towed through the water. Cross bar 40 and release member 42 together form a coacting catch member that releases upon the occurrence of a strike.

Release member 42 is a standard item of commerce. Specifically, it incorporates a tubular housing 47 closed at both ends and having connected to the forward end 49 a connector 48. The trailing end 51 is apertured at 52 through which a Cotter key shaft 55 is reciprocally mounted for sliding movement relative to the aperture. The Cotter key shaft 55 is bent to form a stop 58 against which a spring 59 is compressed. The midsection of the housing 42 is cut to form a cutout 60 through which Cotter key shaft 55 is arranged to form a releasable lock for engagement at cross bar 40. It can thus be seen that a tensile force through the release member 42 between its ends will affect release of the bar 40.

In operation, a fish line 71 is connected to the leading end of release member 42 at connector 31 and tackle including leader 72 and hook 73 is connected to the trailing end of release member 42 at connector 66. Cotter key shaft 55 is manually withdrawn against spring 59. The release member 42 is then inserted through the slot 20 and aligned so that upon release of shaft 55, shaft 40 is captured. A longitudinal platform clamp or connecting member 79 with loops at both ends passes through an aperture 80 at enlarged loop 81 and serially connects swivel 31 to connector 48 at a loop 82.

With reference to FIGS. 1 and 2, it will be seen that the platform is maintained with swivel 31 pivoting at a relatively rigid and firmly spaced, three-dimensional relationship relative to the platform 15. Specifically, the confronting faces of depending fins 35, 36 clamp and prevent side-to-side movement of the release member 42. At the same time, release member 42 clamps and holds the platform at bar 40. Member 79 rigidly holds connector 48 at a relatively fixed angular relation to the surface of platform 15. Member 79 and release member 42 between its leading end and the catch member form a towing bridle for the platform.

The platform is then pulled through the water, typically by a boat 90. As boat 90 progresses through the water, hydraulic pressure against the upper surface of the plane 15 causes the device to dive. Weight of the keel 25 maintains the upright orientation so that the angular relationship shown in FIG. 2 is maintained. As has heretofore been previously explained at length, the apparatus vertically dives and trails the vessel 90 in a vertical plane which includes the trailing path of the line.

It can be seen that as the device gets down to a predetermined depth with a predetermined length of line, the angle of the diving plane 15 will flatten to the point where further diving is resisted. Thus, the device finds a depth which is determined by the length of the line 71 from the towing vessel. Relatively precise prediction and repetition of trolling depth is possible.

When a fish 94 takes the hook 73, pressure is applied to Cotter key 45 to overcome the spring pressure 49 and thereby releases bar 40. Under these circumstances, plane 15 then falls free of the line. Plane 15 offers no diving action and is simply free to trail with the lines so that a fish can be played without the encumbrance of diving action. It is important to note that the release mechanism is not under substantial pressure while the hook 73 is in the normal towed position. The diving forces on the platform are all transmitted through member 79 and bar 40 to enable the line to dive to the predetermined depth. It is only when a fish releases the platform that normal trailing action of the line occurs.

It is emphasized that the particular configurations herein disclosed have been determined after much experimentation. The disclosed device especially with its keel and confronted fins across the slot has the property of tracking and diving in a vertical plane from the towed vessel 90 and is particularly suitable for use from vessels having multiple towed and trolling lines.

Referring to FIGS. 5-8, planar platform 15 is the same as that previously illustrated in all aspects. It substitutes a release member 100 (see FIG. 8), which includes a first looped portion 101 and a second release portion 102 having flared legs 103, 104. Legs 103, 104 are opposed and defined opposing arcuate portions 105, 106. As can be seen clearly in FIG. 5, when first and second release portions 101, 102 are coupled, opposed arcuate portions 105, 106, clamp portion 101 at loop 107 therebetween.

A calibrated set screw 112 extends between paired legs 103, 104. Set screw 112 rotatably attaches at its calibrated head 114 to leg 104 and threadedly attaches at a threaded aperture in leg 103. By simple thumb rotation of calibrated head screw 114 the bias on the legs 103, 104 is adjustable. Calibrations are provided at preset intervals, thus legs 103, 104 can be biased towards one another in a manner to provide an adjustable tension at loop portion 107 of looped member 101.

It is important to note that the portion 102 of release member 100 includes two outwardly flaring members 115, 116 depending outwardly from arcuate portions 105, 106, respectively. These respective flared portions allow looped portion 101 approximately 40° of movement. Thus, trailing leader 72 and hook 73 can move out of line a small up and down distance without causing one of the leg members to open and effect release.

Referring to FIG. 6, the invention is shown in the diving mode. Broadly, release member 102 is clamped with its respective arcuate portions 105, 106 holding looped portion 107 therebetween.

Referring to FIG. 7, a fish 94 has provided a strike. Release member 101 and has disengaged from member 102. The platform now trails in a manner in which platform 15 is parallel to and generally axially aligned and forms a tensive segment of the fishing line between fish 94 and trolling boat 90. This is to distinguished from the previous embodiment wherein the platform 15 trailed to the side and parallel to a line between fish 94 and trolling boat 90.

The enclosed embodiment has an advantage not immediately apparent. Specifically, by the rapid and upward jerk on line 71, release member 102 can be uncoupled from looped member 101. This can occur in the absence of a strike by fish 94. Once this is done, platform 15 may be recovered to the surface a parallel disposition to line 71. Thus, the present invention provides for convenient recovery without water drag being supplied against the bias of the fishing line.

It should be noted that member 102 is rigidly braced between side members 35, 36. Thus, the present invention provides all of the stability previously attained in the embodiment of FIGS. 1-4.

It should also be apparent that the two opposed legs 103, 104 can be biased towards each other by a number of means. Referring to FIG. 9, an elastic band 120 is shown surrounding the respective legs 103, 104 in the vicinity of calibrations 125. By the simple expedient of moving the elastic band towards and away from the upper end of the line, the bias force at arcuate portions 105, 106 can be adjusted. Thus, a simple elastic band can provide the same adjustable tensioning means as the calibrated thumb screw 114.

What is claimed is:

1. Diving apparatus for use with a towed fishing line comprising:

a release member serially connected between a leading segment and a trailing segment of said line, having a first portion with a trailing end connected to said trailing segment of said line and a second portion with a leading end connected to said leading segment of said line;

a planar platform being formed with a leading base area, a pair of trailing flukes separated to form a rearwardly extending open slot from said leading base member;

a connector mounted to said platform at said base and to said leading end of said second portion of said release member to permanently attach said platform to said leading segment of said line;

first and second fin members formed from and supported on said flukes at said slot extending normally to the planar surface of said platform for receiving snugly therebetween a trailing end of said second portion of said release member into said slot and for resisting side to side movement of said second portion of said release member in said slot;

a member spanning said slot, said first portion of said release member being looped at a leading end thereof about said slot spanning member;

said second portion of said release member including first and second flared legs, both said flared legs defining opposed arcuate members, said opposed arcuate members configured for mutual engagement therebetween of said first portion of said release member where said first portion is looped about said slot spanning member;

means tensioning said flared legs of said second portion of said release member towards one another, so that when a force less than a given force is supplied through said line to said platform, said release member portions remain engaged and said platform is held angularly to said line whereby said line sinks, and when a force greater than said given force is supplied through said line to said platform said release member portions disengage and said platform parallels said line whereby said line is permitted to rise.

2. Diving apparatus for connection between a leading segment and a trailing segment of a fishing line comprising:

a first release element portion connectable at a trailing end thereof to said trailing line segment and having a looped section at a leading end thereof;

a second release element portion connectable at a leading end thereof to said leading line segment and having first and second flared legs at a trailing end thereof having a predetermined transverse dimension, said first and second flared legs including opposed arcuate segments for grasping therebetween said looped section;

tensioning means for urging said flared legs towards one another for grasping said looped section therebetween and thus maintaining said first and second release element portions in engagement while allowing said first and second release element portions to become disengaged when a force greater than a given force is exerted between said first and second release element portions;

a planar diving platform being formed with a leading base area, first and second trailing flukes separated to define first and second edges of a slot extending rearwardly from said leading base member;

a connector having a first end mounted to said platform at said base and a second end mounted to said leading end of said second release member portion;

means within said slot for mounting said looped member of said first release element portion in said slot so that engagement of said first and second release element portions causes said flared legs to be maintained within said slots so that said platform and said second release element portion together form a towing bridle on one side of said platform for pulling said platform through water at a preselected and constant diving angle;

first and second fin members formed from and supported on said first and second flukes respectively at said slots, said fin members extending normally to said planar platform;

said first and second fins being juxtaposed to said first and second side edges of said slot to form first and second uninterrupted planar surfaces defining a channel of a width generally that of said predetermined transverse dimension of said flared legs, said fins allowing said flared legs to slide into and out of said channel along said slot for engagement with said looped section therein, but preventing said flared legs and second release element portion from undergoing side to side rotation and translation relative to said diving platform, said fins further inhibiting side to side movement of said diving platform relative to said water such that said second release element portion is held with respect to said connector to form a three-dimensional spaced towing bridle for said platform whereby said platform dives in a substantially vertical plane.

3. The invention of claim 2 wherein said tensioning means includes means for varying the force urging said flared legs towards one another to provide adjustment of said given force above which said first and second release member portions become disengaged.

4. The invention of claim 3 wherein said means for varying the force includes a band extending around said flared portions.

5. The invention of claim 4 wherein said band is elastic.

6. The invention of claim 3 wherein said means for varying said force comprises a calibrated set screw extending between said flared legs.

7. The invention of claim 2 wherein said second release member portion is provided with a preselected range of angular movement, movement out of said range causing said flared legs to be urged away from one another to effect disengagement of said first and second release member portions.

* * * * *